(12) United States Patent
Mandel

(10) Patent No.: US 10,186,359 B2
(45) Date of Patent: Jan. 22, 2019

(54) METHOD FOR ATTACHING A METAL RING IN A FRAME AND INDUCTION COIL OBTAINED BY SAID METHOD

(71) Applicant: ADM28 S.ar.l., Luxembourg (LU)

(72) Inventor: Eric Mandel, Saint-Quentin (FR)

(73) Assignee: ADM28 S.AR.L., Luxembourg (LU)

( * ) Notice: Subject to any disclaimer, the term of this patent is extended or adjusted under 35 U.S.C. 154(b) by 52 days.

(21) Appl. No.: 15/108,839

(22) PCT Filed: Dec. 11, 2014

(86) PCT No.: PCT/EP2014/077437
§ 371 (c)(1),
(2) Date: Jun. 29, 2016

(87) PCT Pub. No.: WO2015/101469
PCT Pub. Date: Jul. 9, 2015

(65) Prior Publication Data
US 2016/0329141 A1    Nov. 10, 2016

(30) Foreign Application Priority Data
Dec. 31, 2013 (FR) ..................... 13 63763

(51) Int. Cl.
*H01F 27/29* (2006.01)
*H01F 5/02* (2006.01)
(Continued)

(52) U.S. Cl.
CPC ............. *H01F 5/02* (2013.01); *B21D 26/14* (2013.01); *B23K 13/02* (2013.01); *H01F 27/29* (2013.01);
(Continued)

(58) Field of Classification Search
CPC ...................... H01F 5/00; H01F 27/00–27/36
(Continued)

(56) References Cited

U.S. PATENT DOCUMENTS 2,066,668 A * 1/1937 Bennett .................. B23K 13/00
219/117.1
2,976,907 A * 3/1961 Harvey .................. B21D 26/14
72/56
(Continued)

FOREIGN PATENT DOCUMENTS

BE          582117 A1   12/1960
CN       102155592 A    8/2011
(Continued)

OTHER PUBLICATIONS

International Search Report dated Jan. 23, 2015, in corresponding PCT application.

*Primary Examiner* — Tuyen Nguyen
(74) *Attorney, Agent, or Firm* — Young & Thompson

(57) ABSTRACT

A method for attaching a metal ring (4) in a bore (3) of a frame (2) made of a different metal, wherein: the ring (4) is set in the bore (3) by way of high-energy forming suitable for urging an outer surface of the ring against the bore (3) with a speed capable of driving out any impurity from an interface between the ring and the frame; the interface between the ring (4) and the frame (2) is heated to a temperature and for a length of time that are determined in accordance with the respective materials of the ring and the frame such as to obtain diffusion welding between the outer surface of the ring and the bore. A single-turn coil for magnetic forming carried out by the method is also described.

15 Claims, 2 Drawing Sheets

(51) Int. Cl.
  *B21D 26/14*   (2006.01)
  *B23K 13/02*   (2006.01)
  *H05B 6/02*    (2006.01)
  *H01F 41/04*   (2006.01)
  *B23K 101/36*  (2006.01)

(52) U.S. Cl.
  CPC ............... *H01F 41/04* (2013.01); *H05B 6/02* (2013.01); *B23K 2101/36* (2018.08)

(58) Field of Classification Search
  USPC ....... 336/65, 83, 90, 92, 192, 200, 220–223, 336/232
  See application file for complete search history.

(56) References Cited

U.S. PATENT DOCUMENTS

| | | |
|---|---|---|
| 3,502,837 A | 3/1970 | Peehs |
| 5,824,998 A | 10/1998 | Livshiz et al. |
| 6,137,094 A | 10/2000 | Kistersky et al. |

FOREIGN PATENT DOCUMENTS

| | | |
|---|---|---|
| JP | S61 1486 A | 1/1986 |
| WO | 00/18526 A2 | 4/2000 |

* cited by examiner

METHOD FOR ATTACHING A METAL RING IN A FRAME AND INDUCTION COIL OBTAINED BY SAID METHOD

The invention relates to a method for attaching a metal ring in a frame and in particular to the application of said method to the production of coils for electromagnetic forming or of plain bearings. The invention also extends to an induction coil for electromagnetic forming which is obtained using said method.

The techniques of electromagnetic forming or magnetic pulse welding, which are known for example from BE582117, make it possible to shape metals, or even to weld them by means of deformations applied by a magneto-mechanical force resulting from the interaction between the Laplace forces and the induced currents generated in a metal part as a result of a sudden change in a magnetic field. One of the most frequent uses of these techniques consists for example in forming restrictions on tubular parts such as setting a lid onto a bottle neck or welding together two concentric tubes. In this type of method, an induction coil is used, preferably a single-turn induction coil inside which the parts to be deformed are placed, and the coil is powered by a current pulse supplied by a high-power pulse generator such as a Marx generator.

However, it has been noted that the radial forces exerted on the part to be deformed were accompanied by a reaction on the coil which outwardly deformed said coil, or even destroyed said coil if this reaction exceeded the elastic limit of the material of the coil. It has thus been suggested to produce coils made entirely of steel, which is an unsatisfactory solution in light of the poor conductivity of steel, or else solid coils made of copper (the cost of which is prohibitive) or else coils which combine a conductive turn made of copper or another material having good electrical conductivity with a framework made of a rigid material such as steel.

U.S. Pat. No. 6,137,094 for example discloses a dual-material coil of this type in which a conductive turn made of beryllium bronze is fixed in a steel frame by means of clamping by a plurality of screws which are orthogonal to the plane of the turn and of the frame. The conductive turn is powered by connection terminals which are rigidly connected to the steel frame. It has been noted that such a coil would rapidly lose effectiveness as a result of electrical losses in the region of the gap remaining between the turn and the frame, between the clamping points. In addition, the presence of this remaining gap leads to the formation of electric arcs between the frame and the turn, which seriously negatively affect the properties for transferring current between the frame and the turn. Furthermore, the mechanical complexity of the turn/frame assembly makes this device very costly with respect to the efficiency thereof.

The invention thus aims to provide a method which makes it possible to fix a conductive turn in a frame made of a different material which does not have the drawbacks from the prior art.

The invention also relates to a method which is not limited to fixing a conductive turn in a frame, but can be extended to fixing a ring made of any metal in a frame, for example to produce plain bearings.

The invention also aims to provide such a method which makes it possible to resolve differing and conflicting constraints between the electrical, mechanical, and economical requirements, such as the need to use metals having a high electrical conductivity, which are generally ductile and costly, in assemblies which have to be rigid and economical.

The invention also relates to such a method which is economical to implement.

The invention further aims to provide an induction coil which is suitable for use in an electromagnetic forming method, which has improved performance both in terms of operating life and in terms of the magnetic field achieved.

The invention also aims to provide an induction coil which is reliable and durable and which can easily be reconditioned in the event of wear or a change of application.

For this purpose, the invention relates to a method for attaching a metal ring in a frame made of a different metal, wherein:
- a bore is produced at a distance from the edges of the frame, which bore passes through the thickness of said frame and has a predetermined internal diameter;
- a metal ring having an external diameter which corresponds to the internal diameter of the bore and having a width which is less than or equal to the thickness of the frame is inserted into the bore;
- the ring is set in the bore by means of high-energy forming suitable for pressing an outer surface of the ring against the bore at a deformation speed of greater than 15 m/s, which is capable of driving out any impurities from an interface between the ring and the frame;
- the interface between the ring and the frame is heated to a temperature and for a length of time that are determined in accordance with the respective materials of the ring and the frame so as to obtain diffusion welding between the outer surface of the ring and the bore.

Throughout the text, the phrase "high-energy forming" denotes any method which makes it possible to bring about plastic deformation of a metal part on a mould or another part having a deformation speed of greater than 15 m/s. Such a deformation generates stresses which are much greater than the elastic limit of the part and which are mainly directed orthogonally to the surface of the part, depending on the thickness thereof. This stress reduces the longitudinal stresses in parallel with the surface which are caused by the deformation of the part in the mould. This reduction in the longitudinal stresses makes it possible to offset the longitudinal elastic springback. As a result, any elastic springback takes place in the direction of the thickness of the part and causes only very few deformations when the stress is no longer applied. Likewise, the phrase "diffusion welding" denotes a joint between two materials which is obtained by solid-phase diffusion of the atoms of one in the other and vice versa, even if the materials are different, the term "diffusion brazing" being reserved for joints in which a liquid phase is formed at the interface of the two materials.

Due to this method combining setting by high-energy forming of the ring in the bore of the frame with diffusion welding of the material of the ring in that of the bore of the frame, it is possible to obtain a continuous joint between two heterogeneous materials, which joint does not have a gap between the ring and the bore and makes it possible to ensure complete electrical continuity between the frame and the ring. The ring can thus initially be mounted with a clearance which allows the manual insertion thereof in the bore, thus with a considerable gap between the frame and the ring. Once the ring is positioned in the bore, high-energy forming is applied, for example electromagnetic forming by expansion, by placing inside the ring in a substantially coaxial manner a coil for electromagnetic forming by expansion which generates a radial force on the ring with a very large amount of energy, leading to a deformation of the ring which is suitable for pressing the outer face thereof against the inner face of the bore at a very high deformation speed, in particular a speed of greater than 15 m/s. As a result, the speed at which the outer face of the ring comes into contact with the inner face of the bore is such that the air which is present between these two surfaces is driven out in a jet which carries away all the impurities and all the contaminants which may be present on these surfaces. The joint thus obtained has close contact between the material of the ring and that of the bore, over the entire contact surface between the ring and the bore. Due to this very close contact, suitable heating of the ring mounted in the bore, to a temperature of between 50% and 90% of the melting point of the material of the ring leads to a diffusion of the atoms of the material thereof in the material of the bore, thus forming a near-perfect weld seam. Thus, despite the dissimilar materials, an attachment of the ring in the frame is achieved which has no cracks or gaps which could negatively affect the properties for transferring current between the frame and the ring.

Advantageously and according to the invention, the high-energy forming is selected from the processes of electromagnetic forming, electrohydraulic forming or explosive forming. These three methods are substantially equivalent in terms of transferring energy and making it possible to impart a very high-speed deformation on the ring, in particular at a speed of greater than 15 m/s, which is suitable for ensuring the close contact between the outer face of the ring and the inner face of the bore in order to subsequently allow diffusion welding between these two surfaces. For example, it is possible to achieve deformation speeds of this type by using energy of approximately 10 to 100 kJ in electromagnetic forming or greater than 100 kJ in electrohydraulic forming.

Advantageously and according to the invention, the interface between the ring and the frame is heated by induction. Induction heating is the preferred method in view of the speed thereof and the energy savings that it allows. Due to this method, heating by means of the Joule effect is generated in the ring and in the frame and in particular at the interface between the two materials by selecting the frequency and the value of the electromagnetic field in accordance with the materials and the shape of the parts to be heated. Of course, other heating methods can be used at the expense of greater heating durations (up to several hours for a copper/steel diffusion for heating under isostatic pressure and under a conventional vacuum by comparison with a few tens of seconds for induction heating).

Advantageously and according to the invention, the method is applied to the production of an induction coil for electromagnetic forming, characterised in that a metal ring which has an electric conductivity of greater than $30.10^6$ S·m$^{-1}$ and a frame made of rigid material which has a Young's modulus of greater than 200 GPa are used. When producing a coil for electromagnetic forming, the ring which forms the conductive turn must be made of a material which allows the conduction of very intense currents, of approximately a few tens of or a few hundred kiloamperes. However, materials which have such a conductivity are generally little resistant and could be destroyed by the forces which develop during the electromagnetic forming if they are not joined to a sufficiently rigid frame.

Advantageously and according to the invention, a copper ring having a thickness of between 2 and 10 mm and preferably between 2 and 5 mm and a steel frame are used. Thus for an electromagnetic forming coil having an internal diameter of approximately 50 mm, a ring having a width of from 5 to 10 mm over a thickness of a few millimeters is sufficient in view of the duration of the current pulses which pass therethrough. In this case, the current flows in the periphery of the conductor (skin effect), and a greater thickness does not have a desirable efficiency/cost ratio.

Advantageously and according to the invention, a radial slot is cut out which passes through the ring and the frame so as to define an electrical path which goes around the ring from one side of the slot to the other. In order to transform the ring set in the frame thereof into a conductive turn, the ring and the frame thereof are opened along a radial slot by a saw cut, for example by a wire saw producing a slot of approximately 2 mm for a turn diameter of 50 mm. Due to the combination of setting and welding the ring in the frame, the production of this slot does not lead to the separation of the ring, as could be the case for setting alone.

The invention also extends to a single-turn induction coil, in particular for electromagnetic forming, comprising:
  a rigid frame made of a material which has a Young's modulus of greater than 200 GPa, said frame comprising a central bore;
  a turn made of conductive material having a conductivity of greater than $30.10^6$ S·m$^{-1}$ which is set and diffusion-welded inside said central bore;
  a radial slot which passes through the frame and defines the ends of the turn.

In particular, the coil comprises a copper turn which is set by high-energy forming and is diffusion-welded in a steel frame, the start and the end of the turn being defined by the sides of the slot which divides the frame from the centre of the central bore as far as one of the edges thereof. The coil thus has the advantage of having complete electrical continuity between the outer face of the copper turn and the inner wall of the bore made in the frame, which makes it possible to prevent electric arcs between the frame and the copper turn.

Advantageously and according to the invention, the frame comprises, on each side of the slot, an attachment foot which is electrically connected to the frame and is suitable for being connected to a terminal of a current pulse generator. The attachment feet extend orthogonally to the plane of the frame and comprise attachment holes which make it possible to clamp said feet on a support so as to prevent the forces exerted on the coil and the frame from leading to an enlargement of the slot. In addition, the attachment feet comprise means for connection to the terminals of a current pulse generator. The electric current thus flows into the coil by entering through one of the attachment feet, passes through the portion of the steel frame which is connected to the attachment foot, then flows into the copper turn as far as the other end of the frame, on the other side of the slot and returns to the generator through the other attachment foot. The flow of the current into the copper turn generates a variable high-intensity magnetic field which makes it possible to exert a necking force on a conductive part which is placed at the centre of the turn.

Advantageously and according to the invention, each attachment foot is respectively welded to a portion of the frame, on either side of the slot. In order to improve the conduction between the attachment feet and the frame, the feet are directly welded, for example by autogeneous welding, to the frame.

The invention also relates to a method for attaching a ring in a frame and a single-turn coil, characterised in combination by all or some of the features mentioned above or below.

Other aims, features and advantages of the invention will become apparent upon reading the following description and the accompanying drawings, in which.

Figure 1:
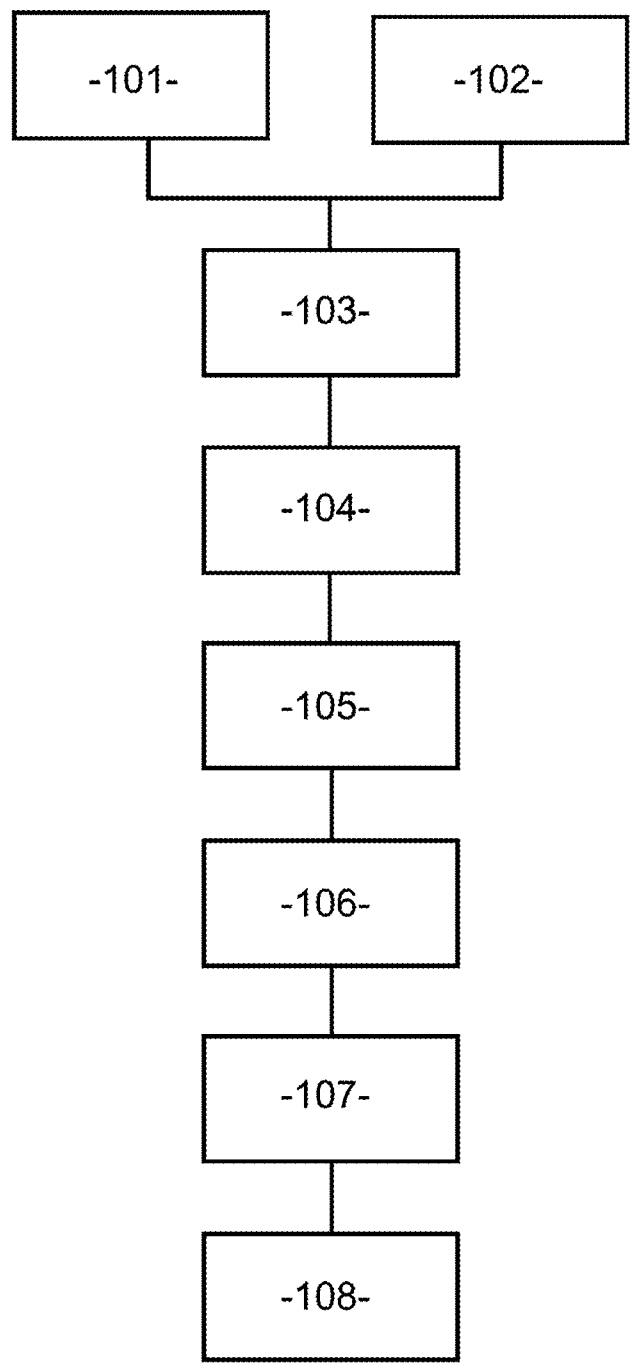
FIG. 1 shows the steps of the method according to the invention.

In the following description, reference is made to FIG. 1 to describe the steps of the method and to FIGS. 2 and 3 to identify the parts.

Figure 2:
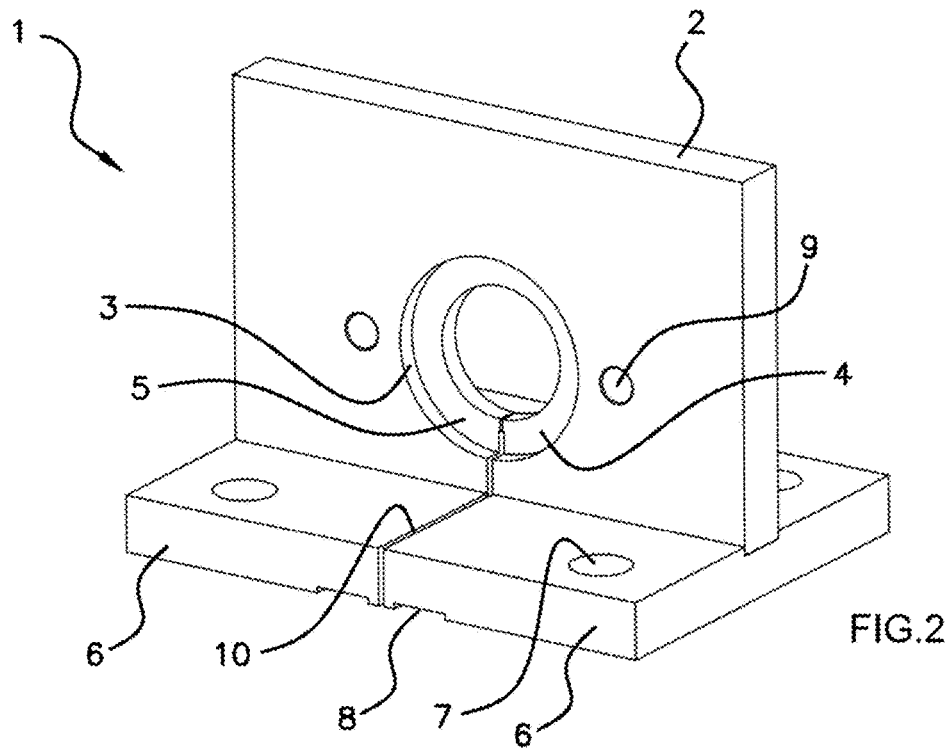
FIG. 2 is a perspective view of an electromagnetic forming coil which is obtained by the method according to the invention.
Figure 3:
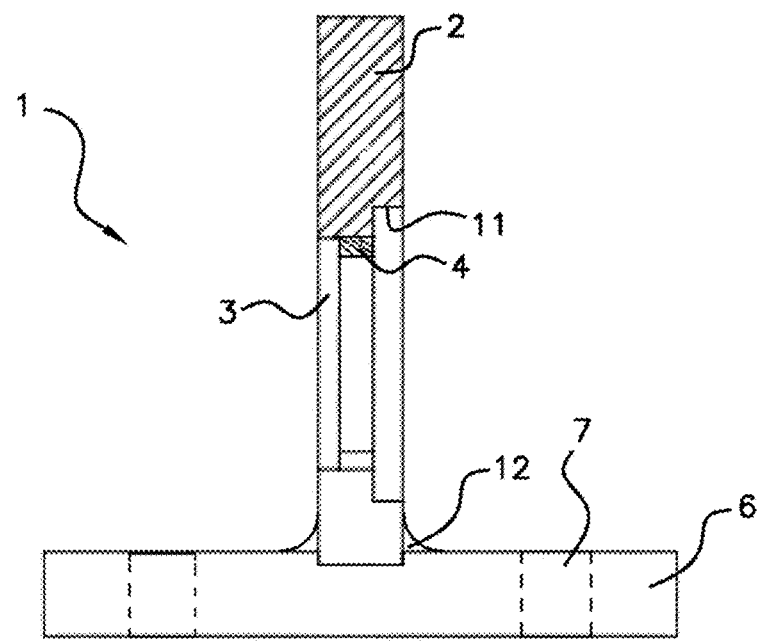
FIG. 3 is a sectional view of an electromagnetic forming coil which is obtained by the method according to the invention.

In step 101 (FIG. 1), a metal frame 2 is prepared, which is preferably made of steel, which in the example shown in FIGS. 2 and 3 is a steel plate having a height of approximately 150 mm, a length of approximately 200 mm and a thickness of approximately 20 mm. Of course, the frame 2 does not necessarily have a rectangular shape but can also assume a circular, semi-circular or other shape. In this step, a bore 3 is produced having an axis which is orthogonal to the main face of the frame 2, substantially in the centre of the plate. The sizes of the frame 2 and the bore 3 are selected in accordance with the size of the ring which is to be installed in the frame to subsequently form an induction coil. In the example shown, the bore produced has a diameter of approximately 60 mm.

In parallel with the preparation of the frame, in step 102, a cylindrical ring 4 made of copper or another material having a high conductivity, for example of greater than $30.10^6$ S·m$^{-1}$, such as gold, silver, aluminium, beryllium etc., is prepared. The ring 4 has an external diameter which corresponds to the diameter of the bore 3, providing a positive clearance, for example of a few tenths or hundredths of a millimeter, making it possible to insert the ring in the bore without having to use a press or other tools which may negatively affect the surface condition of the bore or of the outer face of the ring. The ring 4 has a width which is of the same order of magnitude as the thickness of the frame 2. It is possible to provide for the width of the ring to be less than the thickness of the frame so as to provide a recess between the side of the ring and the edge of the bore, for example to centre any tools subsequently or else to define a forming region which is narrower than the thickness of the frame.

The ring 4 has a wall thickness of approximately 2 to 10 mm and preferably of 2 to 5 mm, depending on the intensity of the electric currents which are likely to pass therethrough, as will be seen below.

In step 103, the ring 4 is inserted into the bore 3. At this stage, the ring 4 is held in the bore by friction. The frame and the ring are then mounted in a high-energy forming apparatus, such as an apparatus for electromagnetic forming by expansion, by mounting an electromagnetic forming coil inside the ring 4 in order to set the ring in the bore. A current pulse is then applied to this coil, the properties of which pulse are established in accordance with the nature of the materials and the sizes of the parts.

By way of example, in order to set a copper ring having a thickness of 5 mm and an external diameter of 60 mm in a bore of 60 mm which is made in a steel frame, a coil is used which is powered by an electric pulse of 20 kV, which develops an energy of approximately 40 kJ for a duration of approximately 50 µs. In this case, the copper ring deforms at a speed of up to 200 m/s and develops a pressure of approximately 40 MPa at the interface between the ring and the bore.

Alternatively, other high-energy forming techniques can be used such as electrohydraulic forming, in which the frame and the ring are arranged in a tank which is filled with water, and a very high-energy electric discharge between electrodes placed in the vicinity of the centre of the ring generates a shock wave which extends radially and presses the outer face of the ring against the wall of the bore. Likewise, the technique of explosive forming can also be used.

In any case, during the forming, the ring 4 is deformed radially, and the outer face thereof is pressed against the wall of the bore at a speed which is greater than or equal to 15 m/s. At this speed, the air remaining between the ring and the bore is driven out in the form of a jet, carrying away therewith any impurities or contaminants (pollution, oxides, etc.) which would have been present between the two surfaces. Furthermore, the two opposing surfaces of the ring and the frame undergo intense plastic deformation, which creates a series of micro-ripples on the contact surface, thus allowing close contact between the two surfaces.

In step 104, diffusion welding is carried out between the outer face of the ring and the inner wall of the bore. Due to the close contact and the residual compressive stress between the outer face of the ring and the inner wall of the bore obtained during the previous step, an initial interface was produced between the two materials of the ring and of the frame, which is suitable for producing a weld by atomic diffusion of one of the two materials in the other. For this purpose, this interface is heated to a high temperature, of approximately 50% to 90% of the melting point of the materials present. For example, in the case of a copper ring in a steel frame, the aim is a temperature of approximately 800° C. in the region of the interface for a duration of a few tens of seconds to a few minutes.

To do this, induction heating of the interface between the copper and the steel is provided by introducing inside the ring 4 an electromagnetic coil which is suitable for generating a variable electromagnetic field. The eddy currents generated in the metal of the ring and more particularly in the frame in the vicinity of the bore create an increase in temperature in the region of the joint, allowing the diffusion of the atoms from the ring into the bore and vice versa. The parameters of the operating conditions of this step can be checked and adjusted by observing the diffusion depth, which must be of approximately a few microns.

At the end of step 104, a ring is thus obtained which is doubly attached by setting and welding in the frame.

However, in the particular case of producing a coil for electromagnetic forming, a current path should be produced inside the coil and, for this purpose, the ring attached in the frame should be transformed into a turn 5 of the coil.

For this purpose, in step 105, a radial slot 10 is produced, for example by sawing, from the inside of the ring 4 and passing completely through the frame 2 so as to create an electrical discontinuity on either side of the slot. As a result, an electric current entering through one side of the slot 10 and leaving through the other side must necessarily follow a path which goes around the bore and the ring 4 which thus forms a turn 5. In the above-mentioned example, for a ring having an external diameter of 60 mm, a slot is provided which has a width of approximately 2 mm.

It should be noted that the production of such a slot 10 is possible only as a result of the diffusion welding carried out in step 104, which in turn is made possible by the setting in step 103. Without this welding, the imbalance introduced by the slot 10 in the radial stresses which are exerted between the ring 4 and the bore could lead to a disconnection of the ring and the bore. Such a disconnection (even a partial disconnection) would then generate one or more gaps between the frame 2 and the turn 5, resulting in a loss of efficiency and reliability of the coil.

In order to complete the production of the electromagnetic forming coil 1, in step 106, a series of machining processes are carried out, for example a counterbore 11 in the frame 2, which is concentric with the ring 4 and with the bore 3, as well as two attachment holes 9 which make it possible to centre and attach a tool for guiding parts to be shaped in relation to the coil 1.

Likewise, in step 107, feet 6 are attached to the frame 2 on either side of the slot 10. Said feet can be attached by any means, but preferably they are welded to the frame by an autogeneous weld 12 in order to ensure electrical conductivity between the feet and each side of the turn 5.

The feet 6 further comprise clamping holes 7 which make it possible to attach the coil 1 to an electromagnetic forming plate (not shown) so as to limit the transmission of forces which seek to move apart the feet and enlarge the slot 10 during electromagnetic forming operations in which the coil 1 is used. Likewise, the feet 6 comprise, on either side of the slot 10 and on the face thereof which is opposite the frame 2, grooves 8 which are suitable for receiving terminals for connection of the coil 1 to the electrodes of the pulse generator.

The coil 1 is lastly completed in step 108, during which an insulating sheet is mounted between the walls of the slot 10 to prevent any arcs between the two ends of the electric circuit. The insulating sheet is preferably a sheet of synthetic material, in particular made of polypropylene, having dielectric properties which are suitable for the current pulses used. Furthermore, it is not impossible for the insulating sheet to be produced by overmoulding of the coil 1.

Of course, the sequence of the operations 105 to 108 is not necessarily carried out in this order. Thus, it may be preferable to weld a single foot to the frame before producing the slot 10 which will then extend through this foot or else to carry out the machining processes in step 106 before producing the slot 10.

Of course, the operations 101 to 104 which define the method for attaching a ring in a frame can be used for the purposes of producing objects other than an electromagnetic forming coil. For example, the method for attaching a metal ring in a frame made of a different metal can be used to produce rotating bearings such as connecting rod bearings or other applications.

The invention claimed is:

1. Method applied to the production of an induction coil for electromagnetic forming for attaching a metal ring (4) in a frame (2) made of a different metal, wherein:
   a bore (3) is produced at a distance from the edges of the frame (2), which bore passes through the thickness of said frame and has a predetermined internal diameter;
   a metal ring (4) having an external diameter which corresponds to the internal diameter of the bore and having a width which is less than or equal to the thickness of the frame (2) is inserted into the bore (3);
   the metal ring (4) is set in the bore by means of high-energy forming suitable for pressing an outer surface of the ring against the bore (3) at a deformation speed of greater than 15 m/s, which is capable of driving out any impurities from an interface between the ring and the frame;
   the interface between the metal ring (4) and the frame (2) is heated to a temperature and for a length of time that are determined in accordance with the respective materials of the metal ring and the frame so as to obtain diffusion welding between the outer surface of the metal ring and the bore, and
   the metal ring has an electric conductivity of greater than $30.10^6$ S·m$^{-1}$ and the frame is made of rigid material which has a Young's modulus of greater than 200 GPa.

2. Method according to claim 1, wherein the high-energy forming is selected from the processes of electromagnetic forming, electrohydraulic forming or explosive forming.

3. Method according to claim 1, wherein the interface between the ring (4) and the frame (2) is heated by induction.

4. Method according to claim 1, wherein a copper ring having a thickness of between 2 and 10 mm and preferably between 2 and 5 mm is used.

5. Method according to claim 1, wherein a steel frame is used.

6. Method according to claim 1, wherein a radial slot (10) is cut out which passes through the ring (4) and the frame (2) so as to define an electrical path which goes around the ring from one side of the slot to the other.

7. Single-turn induction coil (1), in particular for electromagnetic forming, comprising:
   a rigid frame (2) made of a material which has a Young's modulus of greater than 200 GPa, said frame comprising a central bore (3);
   a turn (5) made of conductive material having a conductivity of greater than $30.10^6$ S·m$^{-1}$ which is set and diffusion-welded inside said central bore;
   a radial slot (10) which passes through the frame (2) and defines the ends of the turn (5).

8. Coil according to claim 7, wherein the frame comprises, on each side of the slot (10), an attachment foot (6) which is electrically connected to the frame and is suitable for being connected to a terminal of a current pulse generator.

9. Coil according to claim 8, wherein each attachment foot (6) is respectively welded (12) to a portion of the frame, on either side of the slot (10).

10. Method according to claim 2, wherein the interface between the ring (4) and the frame (2) is heated by induction.

11. Method according to claim 2, which is applied to the production of an induction coil for electromagnetic forming, wherein a metal ring which has an electric conductivity of greater than 30.106 S·m−1 and a frame made of rigid material which has a Young's modulus of greater than 200 GPa are used.

12. Method according to claim 3, which is applied to the production of an induction coil for electromagnetic forming, wherein a metal ring which has an electric conductivity of greater than 30.106 S·m−1 and a frame made of rigid material which has a Young's modulus of greater than 200 GPa are used.

13. Method according to claim 4, wherein a steel frame is used.

14. Method according to claim 4, wherein a radial slot (10) is cut out which passes through the ring (4) and the frame (2) so as to define an electrical path which goes around the ring from one side of the slot to the other.

15. Method according to claim 5, wherein a radial slot (10) is cut out which passes through the ring (4) and the frame (2) so as to define an electrical path which goes around the ring from one side of the slot to the other.

* * * * *